US006290089B1

(12) United States Patent
Sampson et al.

(10) Patent No.: US 6,290,089 B1
(45) Date of Patent: Sep. 18, 2001

(54) TOOLTRAY DEVICE FOR PIPE THREADER

(76) Inventors: Charles P. Sampson, P.O. Box 12914, El Cajon, CA (US) 92022; Gary Sult, P.O. Box 1071, Escondido, CA (US) 92033

( * ) Notice: Subject to any disclaimer, the term of this patent is extended or adjusted under 35 U.S.C. 154(b) by 0 days.

(21) Appl. No.: 09/758,656

(22) Filed: Jan. 12, 2001

(51) Int. Cl.[7] ................................................. B65D 25/22
(52) U.S. Cl. ........................ 220/629; 220/636; 220/475
(58) Field of Search .............................. 220/475, 629, 220/636, 729, 735, 756, 757, 764; 248/512, 246, 128

(56) References Cited

U.S. PATENT DOCUMENTS

| 971,060 | * | 9/1910 | Lynch . | |
|---|---|---|---|---|
| 1,810,855 | * | 6/1931 | Rockmore . | |
| 2,155,772 | | 4/1939 | Porter | 211/86 |
| 2,481,604 | | 9/1949 | Lorenzen | 211/86 |
| 4,611,823 | * | 9/1986 | Haas . | |
| 4,728,118 | * | 3/1988 | Haas . | |
| 6,116,456 | * | 9/2000 | Davis . | |

* cited by examiner

*Primary Examiner*—Stephen Castellano
(74) *Attorney, Agent, or Firm*—Calif Tervo

(57) ABSTRACT

A tooltray device (10), attachable to a pipe threader (101) or other machine tool (100) having carriage rails (160), for holding tooling, workpieces, and hand tools, generally comprises a tool-holding tray (20) with two pivotable arms (40). Tooltray device (10) is attached to rails (160) with arms (40) perpendicular to tray (20), such that bottom (21) of tooltray device (10) can clear the top of back chuck disk (148) or other protruding feature (114) near the back end (130) of pipe threader (101). Once attached, tooltray (10) is pivoted downward to rest on top (111) of pipe threader (101), which supports tooltray (10). Back chuck disk (148) acts to retain tooltray (10) from slipping backward. Hollow back ends (164) of carriage rails (160) of pipe threader (101) are used as attachment points for tooltray arms (40).

20 Claims, 2 Drawing Sheets

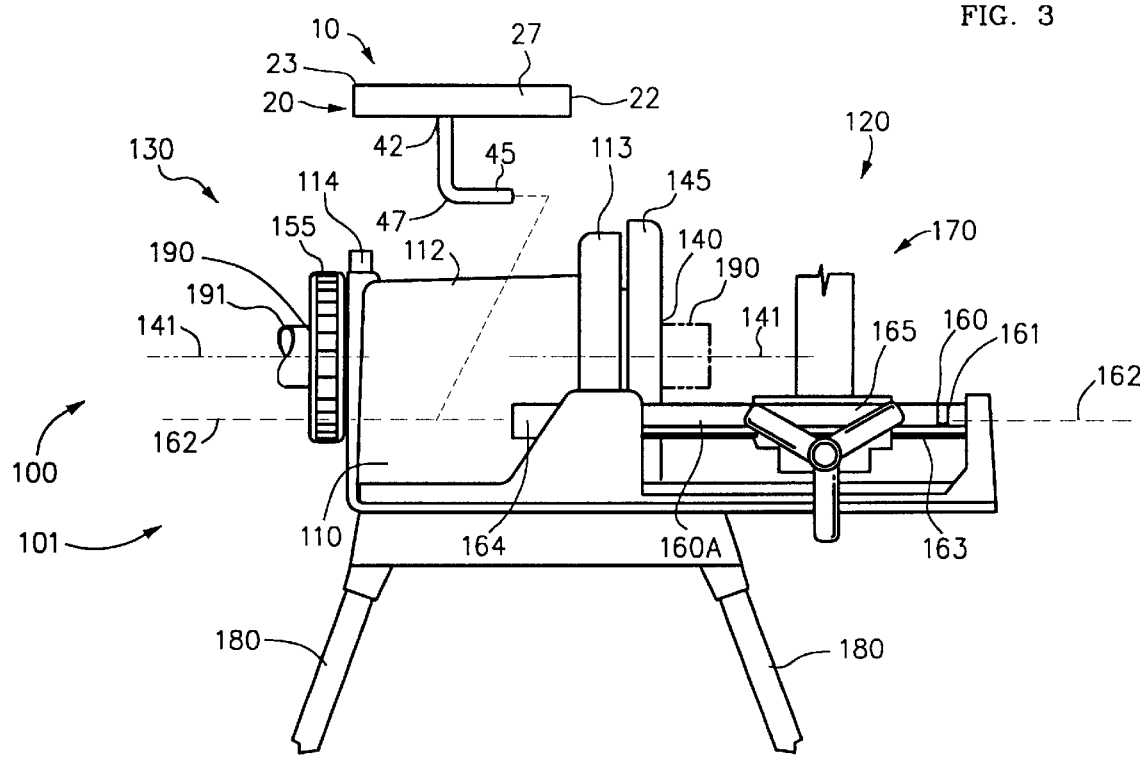
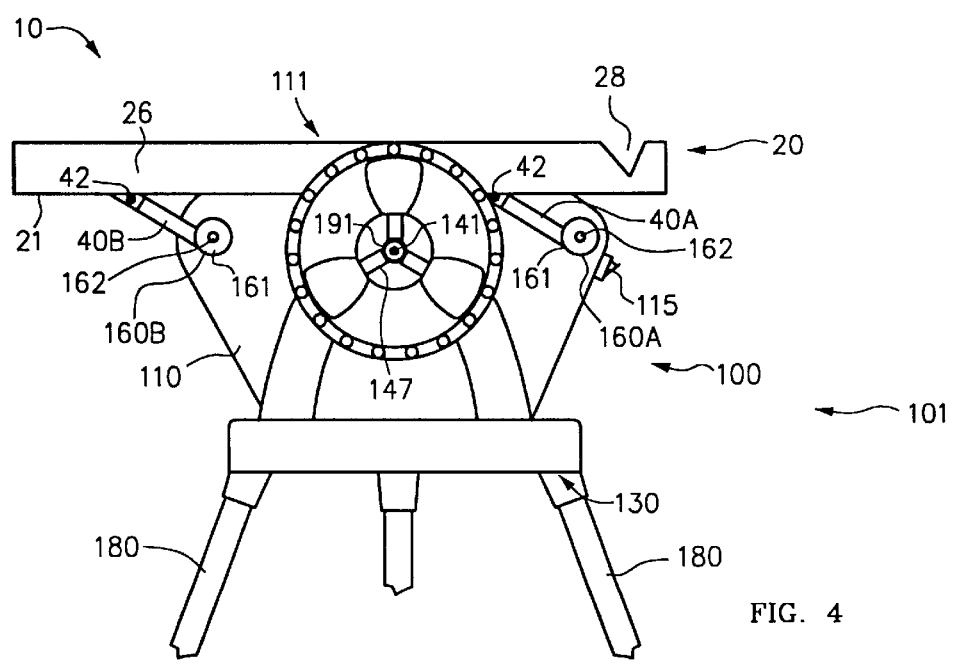

TOOLTRAY DEVICE FOR PIPE THREADER

FIELD OF THE INVENTION

This invention relates generally to tooltrays for holding tools and parts while working, and more particularly to a tooltray that is attached to the carriage rails of a machine tool, such as a pipe threader, and pivots to rest on the top of the machine when in use.

BACKGROUND OF THE INVENTION

Certain machine tools, such as pipe threaders, are often used in a field setting. The tools are portable and have their own sturdy stands. A pipe threader uses interchangeable tooling heads for threading, cutting, and reaming pipe. There is a need for a tooltray to hold these heads, as well as the ancillary screwdrivers, wrenches, or other hand tools needed to change the heads. There is a further need for the tooltray to be portable and sturdy enough for field work.

It is especially desirable to have a tooltray that mounts directly onto existing features of the pipe threader, in order that the tooltray be as simple as possible. Mounting the tooltray on the pipe threader allows use of the pipe threader to support the load, keeping the tooltray light and inexpensive. The means for mounting the tooltray needs to be quickly and easily operated, as it will be used often. The mounting must be reliable and prevent the tooltray from slipping off the pipe threader or moving around during use.

Other tooltray devices that mount onto a machine tool have been developed, such as Lorenzen (U.S. Pat. No. 2,481,604) but the need to avoid interfering with operation of the machine tool limits their size, placement, and applicability. There exists a need for a tooltray device that can be mounted easily onto a machine tool and does not interfere with use of the tool or access to controls.

SUMMARY OF THE INVENTION

This invention is a tooltray device that attaches to the carriage rails of a pipe threader, or similar machine tool. In a preferred embodiment, it comprises a tray for holding tools with two pivotably attached arms for connecting the tray to the pipe threader. The lower end of each arm includes a shaft that plugs into the hollow back end of one of the tubular carriage rails. The shaft fits tightly enough into the rail that the tooltray device is held in place during use but the shafts can be pivoted when force is applied by the person operating the pipe threader.

The arms of the tooltray are attachable to the carriage rails while in a position perpendicular to the tray. After attachment of the arms, the tray is swung to one side. Both ends of the arms pivot, the tooltray device moves laterally and downwardly, and comes to rest atop the housing of the pipe threader.

The initial perpendicular position of the arms maximizes the clearance between the tray and the back chuck disk of the pipe threader, which is elevated above the main body of the machine's housing. After the tooltray device has cleared the back chuck disc, pivoting the tooltray down and to the side allows the tray to rest on the housing between the front and back chuck disks. The housing supports the tray and the chuck disks prevent it from slipping to the front or back. Pivoting the tooltray device to one side gives unimpaired access to one side of the machine, such as the one having a power switch.

The accompanying drawings disclose a specific embodiment of the present invention, and are not intended to limit the principles of the invention and structural implementation of the inventive concept. It is therefore to be understood that within the scope of the appended claims, the invention may be practiced otherwise than as specifically described.

The invention will now be described in more particular detail with respect to the accompanying drawings, in which like reference numerals refer to like parts throughout.

BRIEF DESCRIPTION OF THE DRAWINGS

FIG. 3 is an exploded side elevation view of the tooltray device and pipe threading machine.

FIG. 4 is an enlarged rear elevation view of the tooltray device attached to the pipe threading machine of FIG. 3.

DETAILED DESCRIPTION OF THE INVENTION

Figure 1:
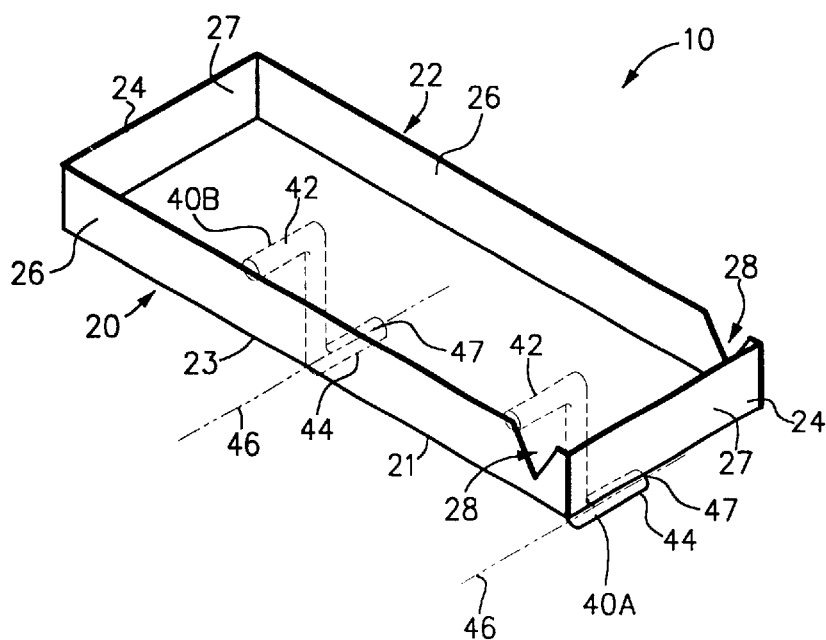
FIG. 1 is a perspective view of a preferred embodiment of the tooltray device with the arms, which are attached underneath, shown partly in phantom.
Figure 2:
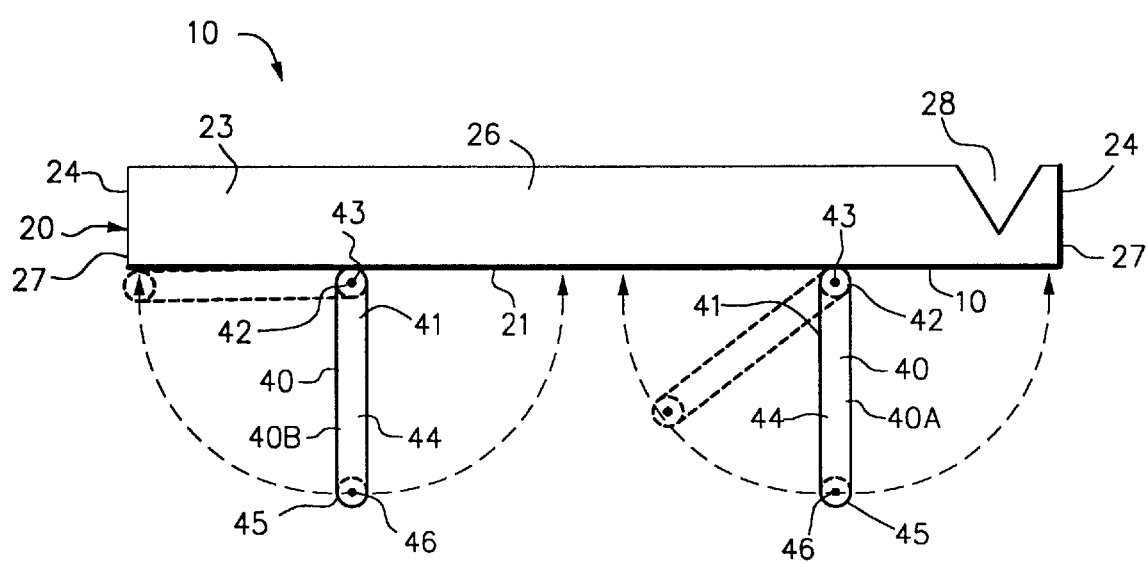
FIG. 2 is a back elevation view, with the pivot range and alternative positions of the arms shown as dashed lines.

With reference to FIGS. 1 and 2 of the drawings, FIG. 1 is a perspective view of a preferred embodiment of the tooltray device 10 and FIG. 2 is a back elevation view. Tooltray device 10 generally comprises a horizontal tray 20 for holding tools, tray walls for retaining tools on tray 20, and two arms 40 for attaching tray 20 to a pipe threading machine 101 or other machine tool 100.

Horizontal tray 20 has a bottom 21, two ends 24, a front 22, and a back 23. Front wall 25 is attached to and extends upward from tray front 22, back wall 26 is attached to tray back 23 and extends upward, and an end wall 27 is attached to and extends upward from each of tray ends 24. Securing means 28 provides a holder for a pipe or other slender item wider than the tray, and in the embodiment illustrated, consists of a V-shaped cutout portion in each of front wall 25 and back wall 26.

In FIG. 1, arms 40, such as left arm 40A and right arm 40B, are shown partially in phantom, underneath tray 20. As best seen in FIG. 2, left arm 40A and right arm 40B each has an upper end 41 and a lower end 44. Arms 40A,40B have pivotable tray attachments 42 on upper ends 41, pivotably attaching arms 40 to tray 20, such as to bottom 21. Lower ends 44 include rail attachment means 45, such as insertion shafts 47. Dashed lines show the pivot range of arms 40 about an upper pivot axis 43 in a preferred embodiment. The purpose of the pivotable attachments will be explained below; however, other embodiments are envisioned in which the arms do not pivot through an entire semicircle, or are non-pivoting.

FIG. 3 is an exploded side elevation view of tooltray device 10 in relation to machine tool 100, which in the embodiment illustrated is pipe threader 101. Tray front 22 of tooltray device 10 faces the same direction as front end 120 of pipe threader 101. Likewise, tray back 23 of device 10 faces the back end 130 of pipe threader 101. Left arm 40A is seen; right arm 40B, not seen, is a mirror image of left arm 40A. Tray attachment 42 pivotably attaches upper end 41 of arm 40 to tray 20, and may be, for example, a hinge or sleeve. Rail attachment means 45, such as insertion shaft 47, pivotably attaches left arm 40A to left carriage rail 160A. In a preferred embodiment, left carriage rail 160A includes a back end 130 with a cylindrical hollow portion 161. In this preferred embodiment, insertion shaft 47 is a cylindrical shaft having an outer diameter slightly less than the outer diameter of hollow portion 161. Shaft 47 is inserted into hollow portion 161, where it can freely pivot. Right carriage rail 160B, not seen, is a mirror image of left carriage rail 160A.

With reference now to both FIGS. 3 and 4, pipe threader 101 has a housing 110, which has a top 111. Power switch 115 is located generally on the left side of housing 110, as viewed from front end 120 of pipe threader 101, of housing 110. Workpiece 190, such as pipe 191, is disposed through pipe threader 101 from front end 120 to back end 130 and is held in place by front chuck 145 and back chuck 147. Pipe 191 is rotated about a horizontal rotation axis 141 by a suitable means 140, such as an electric motor (not shown). Interchangeable tooling 170, such as a threader, reamer, or cutter, is mounted on carriage 165. Carriage 165 mounts on left and right carriage rails 160A, 160B and moves frontward and backward on carriage rails 160, which have a longitudinal axis 162 that is parallel to rotation axis 141. Carriage 165 is moved backward along carriage rails 160 until the tooling contacts the rotating pipe 191 and performs a work operation on it.

Left and right carriage rails 160A, 160B each include a carriage end 163 and a back end 164. Back ends 164 are existing features of pipe threader 191 that are employed as attachment points for left and right arms 40A, 40B of tooltray device 10. In the embodiment illustrated, back ends 164 are elongated hollow pieces 161, such as metal tubing of circular cross-section.

Tooltray device 10 attaches to pipe threader 101 as follows. Tooltray device 10 is mounted onto carriage rails 160 by a person holding tooltray 10 such that arms 40 hang straight below tray 20, insertion shaft 47 of left arm 40A is behind back end 164 of left carriage rail 160A, and insertion shaft 47 of right arm 40B is behind back end 164 of right carriage rail 160B. Then, tooltray device 10 is moved frontward such that each insertion shaft 47 moves along the longitudinal axis 162 of the respective carriage rail 160. The shafts 47 are attached to back ends 164, such as by inserting shaft 47 into hollow piece 161. Many other attachment means 45 are envisioned but not illustrated, such as a collar on each of lower ends 44 to encircle back ends 164 of carriage rails 160 or a pin on each of lower ends 44 inserted into corresponding holes through back ends 164. Rail attachment means 45 allows arms 40 to pivot about a lower pivot axis 46 that is parallel to rotation axis 141.

After tooltray device 10 is mounted on carriage rails 160, tooltray device 10 is pivoted to one side until bottom 21 of tray 20 comes to rest on top 111 of housing 110, such as on upper receiving surface 112 of pipe threader 101. Arms 40 are pivoted about upper pivot axes 43 and lower pivot axes 46, causing tray 20 to swing downward toward upper receiving surface 112 and to one side of pipe threader 101. If both tray attachments 42 and rail attachments 45 are completely freely pivotable about their respective pivot axes, the operator may choose to swing tooltray device 10 toward either the right or the left side of pipe threader 191. In the embodiment of FIG. 4, tooltray 10 has been pivoted to the right, in order to provide convenient access to and a clear view of power switch 115. Other embodiments envisioned include tray attachment means 42 or rail attachment means 45 with stop means for limiting pivot ranges such that tray 20 does not rest on housing 110. In another embodiment, tray attachment means 42 are non-pivotable and fixed at the angle at which bottom 21 of tray 20 rests on top 111 of machine tool 190. Resting bottom 21 on top 111, such as on a receiving surface 112 of housing 110 of pipe threader 191, stabilizes tooltray device 10 and allows it to hold a heavier load than it could without such support.

Existing features of pipe threader 101 are also used to keep tooltray device 10 from slipping frontward or backward. Preferably, pipe threader 191 includes a front retaining feature 113, such as stationary front chuck disk 146 and a back retaining feature, such as stationary back chuck disk 148. Receiving surface 112 lies between these two features, which partially protrude above receiving surface 112. The width of tooltray device 10 from front 22 to back 23 is less than the distance between front chuck disk 146 and back chuck disk 148. When tooltray device 10 is pivoted to rest upon receiving surface 112, chuck disks 146,148 retain tooltray device 10 from slipping or creeping so far frontward or backward, respectively, that rail attachment means 45 can detach from carriage rails 160 or tray 20 interferes with operation of pipe threader 101. By using these existing features of pipe threader 101 as retaining features, rail attachment means 45 does not need to include a locking means for preventing inadvertent detachment of tooltray 10 during use. To use tooltray device 10 on a machine tool that lacks protruding features, back retaining feature 114, front retaining feature 113, or both, could be added to machine tool 100, such as by gluing a piece of metal or hard plastic onto top 111 of machine tool 100, or by sinking a bolt into top 111 with the head protruding.

It can be seen that the present invention provides a simple and convenient place for storage of tools and tooling heads. It is attached to the machine tool by means of features already existing on the machine. In use, the tooltray device rests on the top of the machine tool and is supported by it. Pivotable arms allow the tooltray device to clear the protruding retaining features, such as existing chuck disks, when the tray is being attached, then pivot down into place. Since the tooltray device moves to one side as it pivots down, the machine tool operator has unimpaired access to one side of the machine tool and can operate the power switch or other controls without having to lean down to peer under the edge of the tray.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A tooltray device for attachment to a machine tool having:
   means for rotating a workpiece about a horizontal rotation axis; a front end; a back end opposite the front end; a top including: an upper receiving surface; a left carriage rail having a longitudinal axis parallel to the rotation axis and, in front view, disposed to the left of the rotation axis; the left carriage rail including a back end; and a carriage end opposite the back end of the left carriage rail; and a right carriage rail parallel to and spaced apart from the left rail and having a longitudinal axis parallel to the rotation axis and, in front view, disposed to the right of the axis of rotation; the right carriage rail including a back end; and a carriage end opposite the back end of the right carriage rail; said tooltray device comprising:
   a horizontal tray, comprising:
      a bottom,
      a front,
      a rear, and two ends;
a left arm, including:
an upper end pivotally attached to said bottom of said tray, so as to be pivotable about a left upper pivot axis parallel to the rotation axis; and
a lower end including:
left attachment means for attaching said lower end of said left arm to the left carriage rail by forward movement of said left attachment means along the longitudinal axis of the left rail from behind the back end of the left rail such that the left attachment means engages the left rail such that said left arm is pivotable about a left lower pivot axis coaxial to the longitudinal axis of the left carriage rail; and
a right arm, including:
an upper end pivotally attached to said bottom of said tray so as to be pivotable about a right upper pivot axis parallel to the rotation axis; and
a lower end including:
right attachment means attaching said lower end of said right arm to the right carriage rail by forward movement of said right attachment means along the longitudinal axis of the right rail from behind the back end of the right rail such that said right attachment means engages the right rail such that said right arm is pivotable about a right lower pivot axis coaxial to the longitudinal axis of the right carriage rail.

2. The tooltray device of claim 1, wherein:
said tooltray device is adapted such that said horizontal tray may rest on the upper receiving surface of the machine tool when pivoted about said lower pivot axes.

3. The tooltray device of claim 2, wherein:
said tray is adapted for interaction with the top of the machine tool when resting thereon such that said tooltray is restrained from rearward movement sufficient to detach said attachment means from the rails.

4. The tooltray device of claim 3, wherein:
said tray rests on the machine tool in front of a raised feature behind the upper receiving surface.

5. The tooltray device of claim 1, wherein:
said tray further comprises:
a front wall extending upward from said front of said tray;
a back wall extending upward from said back of said tray; and
an end wall extending upward from each of said ends of said tray.

6. The tooltray device of claim 5, wherein:
said front and said back wall include:
securing means for securing an object wider than said tooltray device.

7. A tooltray device for attachment to a pipe threader having
means for rotating a pipe about a horizontal rotation axis; a front end; a back end opposite the front end; a top including an upper receiving surface; a front chuck; a back chuck; a left carriage rail having a longitudinal axis parallel to the rotation axis and, in front view, disposed to the left of the rotation axis; the left carriage rail including a back end; and a carriage end opposite the back end of the left carriage rail; and a right carriage rail parallel to and spaced apart from the left rail and having a longitudinal axis parallel to the rotation axis and, in front view, disposed to the right of the axis of rotation; the right carriage rail including a back end; and a carriage end opposite the back end of the right carriage rail; said tooltray device comprising:
a horizontal tray, comprising:
a bottom,
a front,
a rear, and
two ends;
a left arm, including:
an upper end pivotally attached to said bottom of said tray, so as to be pivotable about a left upper pivot axis parallel to the rotation axis; and
a lower end including:
left attachment means for attaching said lower end of said left arm to the left carriage rail by forward movement of said left attachment means along the longitudinal axis of the left rail from behind the back end of the left rail such that the left attachment means engages the left rail such that said left arm is pivotable about a left lower pivot axis coaxial to the longitudinal axis of the left carriage rail; and
a right arm, including:
an upper end pivotally attached to said bottom of said tray so as to be pivotable about a right upper pivot axis parallel to the rotation axis; and
a lower end including:
right attachment means attaching said lower end of said right arm to the right carriage rail by forward movement of said right attachment means along the longitudinal axis of the right rail from behind the back end of the right rail such that said right attachment means engages the right rail such that said right arm is pivotable about a right lower pivot axis coaxial to the longitudinal axis of the right carriage rail.

8. The tooltray device of claim 7, wherein:
said tooltray device is adapted for resting on the upper receiving surface of the pipe threader when pivoted about said lower pivot axes.

9. The tooltray device of claim 8, wherein:
said tray is adapted for interaction with the top of the machine tool when resting thereon such that said tooltray is restrained from rearward movement sufficient to detach said attachment means from the rails.

10. The tooltray device of claim 7, wherein:
said tray further comprises:
a front wall extending upward from said front of said tray;
a back wall extending upward from said back of said tray; and
an end wall extending upward from each of said ends of said tray.

11. The tooltray device of claim 10, wherein:
said front wall and said back wall include:
securing means for securing an object wider than said tooltray device.

12. The tooltray device of claim 7, wherein:
said left and right attachment means each includes:
a shaft adapted for insertion into the back ends of the carriage rails.

13. In combination:
a machine tool comprising:
means for rotating a workpiece about a horizontal rotation axis;
a front end;

a back end opposite said front end;
a top;
a left carriage rail having a longitudinal axis parallel to the rotation axis and, in front view, disposed to the left of the axis of rotation; said left carriage rail including:
  a back end; and
  a carriage end opposite said back end of said left carriage rail; and
a right carriage rail parallel to and spaced apart from said left rail and having a longitudinal axis parallel to the rotation axis and, in front view, disposed to the right of the axis of rotation; said right carriage rail including:
  a back end; and
  a carriage end opposite said back end of said right carriage rail; and
a tooltray device attached to said machine tool, said tooltray device comprising:
  a horizontal tray, comprising:
    a bottom;
    a front;
    a rear; and:
    two ends;
  a left arm, including:
    an upper end pivotally attached to said bottom of said tray so as to be pivotable about a left upper pivot axis parallel to the rotation axis; and
    a lower end including:
      left attachment means attaching said lower end of said left arm to said left carriage rail by forward movement of said left attachment means along the longitudinal axis of said left rail from behind said back end of said left rail such that said left attachment means engages said left rail such that said left arm is pivotable about a left lower pivot axis coaxial to the longitudinal axis of said left carriage rail; and
  a right arm, including:
    an upper end pivotally attached to said tray so as to be pivotable about a right upper pivot axis parallel to the rotation axis; and
    a lower end including:
      right attachment means attaching said lower end of said right arm to said second carriage rail by forward movement of said right attachment means along the longitudinal axis of said right rail from behind said back end of said right rail such that said right attachment means engages said right rail such that said right arm is pivotable about a right lower pivot axis coaxial to the longitudinal axis of said right carriage rail.

14. The combination of claim 13, wherein:
said top of said machine tool includes:
  an upper receiving surface; and
said tooltray device is adapted for resting on said upper receiving surface when pivoted about the lower pivot axes.

15. The combination of claim 14, wherein:
said machine tool includes:
  a retaining means for preventing said tooltray device from backward movement resulting in detachment from said carriage rails when said tooltray device is resting on the upper receiving surface.

16. The combination of claim 15, wherein:
said retaining means includes:
  a raised feature behind said upper receiving surface.

17. The combination of claim 13, wherein:
said tray further comprises:
  a front wall extending upward from said front of said tray;
  a back wall extending upward from said back of said tray; and
  an end wall extending upward from each of said ends of said tray.

18. The combination of claim 17, wherein:
said front wall and said back wall include:
  securing means for securing an object wider than said tooltray device.

19. The combination of claim 13, wherein:
said back ends of said carriage rails are hollow; and
said left and right attachment means each includes:
  a shaft adapted for insertion into said hollow back end.

20. The combination of claim 13, wherein:
said machine tool is a pipe threader.

* * * * *